US010257384B2

(12) United States Patent
Okumura

(10) Patent No.: US 10,257,384 B2
(45) Date of Patent: Apr. 9, 2019

(54) IMAGE PROCESSING APPARATUS

(71) Applicant: KYOCERA Document Solutions Inc., Osaka-shi, Osaka (JP)

(72) Inventor: Ryuichi Okumura, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 41 days.

(21) Appl. No.: 15/796,464

(22) Filed: Oct. 27, 2017

(65) Prior Publication Data

US 2018/0124277 A1    May 3, 2018

(30) Foreign Application Priority Data

Oct. 28, 2016 (JP) .................... 2016-211419

(51) Int. Cl.
*H04N 1/387* (2006.01)
*H04N 1/00* (2006.01)
*G06K 15/02* (2006.01)

(52) U.S. Cl.
CPC ....... *H04N 1/3878* (2013.01); *G06K 15/1836* (2013.01); *G06K 15/1842* (2013.01); *H04N 1/00718* (2013.01); *H04N 2201/0094* (2013.01)

(58) Field of Classification Search
CPC ............. H04N 1/3878; H04N 1/00718; H04N 2201/0094; G06K 15/1836; G06K 15/1842; G06K 9/3275; G06K 9/3208
USPC ....... 358/1.11–1.18, 462; 382/175–180, 289, 382/290
See application file for complete search history.

(56) References Cited

U.S. PATENT DOCUMENTS

| | | | | |
|---|---|---|---|---|
| 5,245,676 A | * | 9/1993 | Spitz | G06K 9/3283 382/235 |
| 5,359,677 A | * | 10/1994 | Katsurada | G06K 9/3283 358/488 |
| 5,506,918 A | * | 4/1996 | Ishitani | G06K 9/3283 382/173 |

(Continued)

FOREIGN PATENT DOCUMENTS

| | | | |
|---|---|---|---|
| JP | 2005210493 A | * | 8/2005 |
| JP | 2005210493 A | | 8/2005 |

(Continued)

*Primary Examiner* — Chad Dickerson
(74) *Attorney, Agent, or Firm* — Alleman Hall Creasman & Tuttle LLP

(57) ABSTRACT

A binary image generation portion binarizes a scanned image and generates a binary image. A specific character position detection portion (a) specifies rectangles that circumscribe a plurality of characters, respectively, in the binary image, (b) detects a plurality of specific characters having longitudinal lines or transverse lines at centers of the specified circumscribing rectangles, and (c) detects, as positions of the plurality of specific characters, center positions of the longitudinal lines or the transverse lines, within a predetermined range, to be detected, in a main scanning direction or a sub-scanning direction. A skew angle specifying portion specifies an alignment direction in which the plurality of specific characters are aligned, based on the positions of the plurality of specific characters detected in the range to be detected, and specifies a skew angle of a document image in the scanned image, based on the specified alignment direction.

4 Claims, 6 Drawing Sheets

(56) References Cited

U.S. PATENT DOCUMENTS

| | | | | |
|---|---|---|---|---|
| 5,781,660 A * | 7/1998 | Nitta | ............... | G06K 9/3283 |
| | | | | 382/173 |
| 5,818,976 A * | 10/1998 | Pasco | ............... | G06K 9/3283 |
| | | | | 382/289 |
| 6,360,026 B1 * | 3/2002 | Kulkarni | ............ | G06K 9/3283 |
| | | | | 382/289 |
| 6,415,064 B1 * | 7/2002 | Oh | ............... | G06K 9/3283 |
| | | | | 358/448 |
| 6,549,680 B1 * | 4/2003 | Revankar | ............ | G06K 9/3283 |
| | | | | 382/289 |
| 6,683,983 B1 * | 1/2004 | Shen | ............... | G06K 9/3283 |
| | | | | 358/452 |
| 6,771,842 B1 * | 8/2004 | Sakai | ............... | G06T 3/608 |
| | | | | 358/488 |
| 8,588,549 B2 * | 11/2013 | Yi | ............... | H04N 1/00005 |
| | | | | 358/448 |
| 2012/0262750 A1 * | 10/2012 | Kinoshita | .......... | G06K 15/1247 |
| | | | | 358/1.14 |
| 2013/0182002 A1 * | 7/2013 | MacCiola | ............ | H04N 1/387 |
| | | | | 345/589 |
| 2017/0171428 A1 * | 6/2017 | Kawano | ............ | H04N 1/00718 |
| 2017/0237875 A1 * | 8/2017 | Negami | ............ | G06K 9/00463 |
| | | | | 358/488 |

FOREIGN PATENT DOCUMENTS

| | | | |
|---|---|---|---|
| JP | 2014230222 A | * | 12/2014 |
| JP | 2014230222 A | | 12/2014 |

\* cited by examiner

IMAGE PROCESSING APPARATUS

INCORPORATION BY REFERENCE

This application is based upon and claims the benefit of priority from the corresponding Japanese Patent Application No. 2016-211419 filed on Oct. 28, 2016, the entire contents of which are incorporated herein by reference.

BACKGROUND

The present disclosure relates to image processing apparatuses.

When an image processing apparatus such as a scanner reads an image, if a document is placed on a platen glass in a skewed state, or a document is skewed in the case of the document being fed by an automatic document feeder (ADF), a read document image may be skewed.

A certain image processing apparatus detects an edge position along a main scanning direction and a sub-scanning direction, specifies an edge of a document image on the basis of the edge position, and detects a skew of the document image on the basis of the edge.

Another image processing apparatus has a background medium having a color different from a background color of a document, detects a position of a corner point of a document image in a scanned image, and detects a skew of the document image on the basis of the position of the corner point.

SUMMARY

An image processing apparatus according to the present disclosure includes a binary image generation portion, a specific character position detection portion, and a skew angle specifying portion. The binary image generation portion is configured to binarize a scanned image and generate a binary image. The specific character position detection portion is configured to (a) specify rectangles that circumscribe a plurality of characters, respectively, in the binary image, (b) detect a plurality of specific characters having longitudinal lines or transverse lines at centers of the specified circumscribing rectangles, and (c) detect, as positions of the plurality of specific characters, center positions of the longitudinal lines or the transverse lines, within a predetermined range, to be detected, in a main scanning direction or a sub-scanning direction. The skew angle specifying portion is configured to specify an alignment direction in which the plurality of specific characters are aligned, on the basis of the positions of the plurality of specific characters detected in the range to be detected, and specify a skew angle of a document image in the scanned image on the basis of the specified alignment direction.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure will be described below with reference to the drawings.

Embodiment 1

Figure 1:
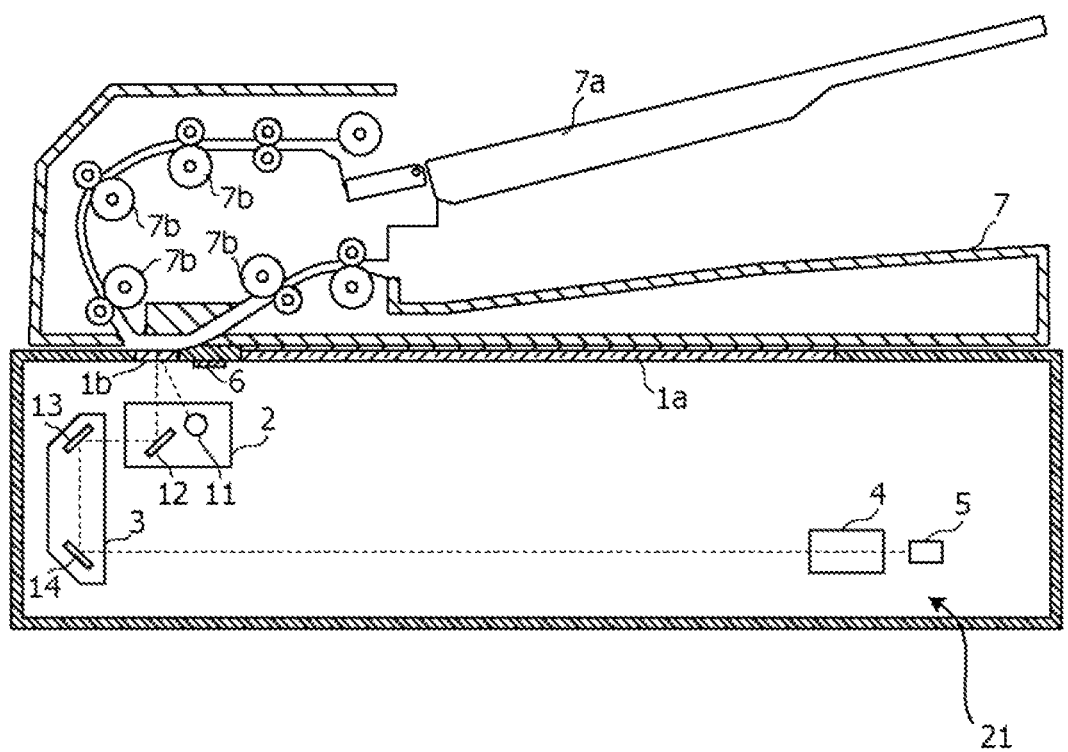
FIG. 1 is a side view of an internal structure of an image processing apparatus according to an embodiment of the present disclosure.

An image processing apparatus, shown in FIG. 1, according to an embodiment of the present disclosure is an apparatus such as a scanning machine, a copying machine, a facsimile machine, and a multifunction peripheral.

The image processing apparatus shown in FIG. 1 includes contact glasses 1a, 1b, carriages 2, 3, an imaging lens 4, an image sensor 5, a white reference patch 6, and a document cover 7.

The contact glass 1a is disposed on the upper surface of a main body of the image processing apparatus, and a document is placed on the contact glass 1a when an image is read without using an automatic document feeder (ADF) of the document cover 7.

Further, the contact glass 1b is disposed on the upper surface of the main body of the image processing apparatus, and a document passes over the contact glass 1b when an image is read while the document is automatically conveyed by the ADF of the document cover 7. The above-described ADF feeds a document such that the document passes over the contact glass 1b, and an image reading portion 21 reads an image of the document that passes over the contact glass 1b.

In the image reading portion 21, the carriage 2 is disposed so as to be movable in the sub-scanning direction by a not-illustrated driving source. The carriage 2 has a light source 11 and a mirror 12. The light source 11 is disposed along the main scanning direction, has, for example, a plurality of light emitting diodes which are arrayed, and emits light by the plurality of light emitting diodes. The light emitted from the light source 11 is reflected by, for example, a document placed on the contact glass 1a or a document that passes over the contact glass 1b, according to the position of the carriage 2. The mirror 12 reflects the light that is reflected by the document or the like. In a case where an image of a document is read by using the ADF of the document cover 7, the carriage 2 is fixedly disposed below the contact glass 1b. Further, the carriage 3 is disposed so as to be movable together with the carriage 2 in the sub-scanning direction by a not-illustrated driving source. The carriage 3 has mirrors 13, 14. The mirrors 13, 14 reflect the light that is reflected by the mirror 12 of the carriage 2 such that the reflected light is transmitted along the sub-scanning direction.

The imaging lens 4 focuses the light from the mirror 14 onto the image sensor 5. The image sensor 5 is a one-dimensional image sensor that has light receiving elements which are arrayed in the main scanning direction and which correspond to a predetermined number of pixels, and outputs, for each line, an electrical signal corresponding to an amount of light received at each pixel of the number of the pixels. As the image sensor 5, for example, a CCD (Charge Coupled Device) is used.

The white reference patch 6 is a plate-shaped member that is disposed on the top surface of the inside of the apparatus, and used for obtaining white reference data.

The document cover 7 is disposed so as to be pivotable and be able to be in surface contact with the contact glass 1a. The document cover 7 allows a document to be in close contact with the contact glass 1a, and prevents ambient light from being incident on the inside of the apparatus through the contact glass 1 when an image is read. Further, the document cover 7 has the ADF, and feeds, one by one, documents placed on a document tray 7a by using feed rollers 7b, and allows the documents to pass over the contact glass 1b.

Figure 2:
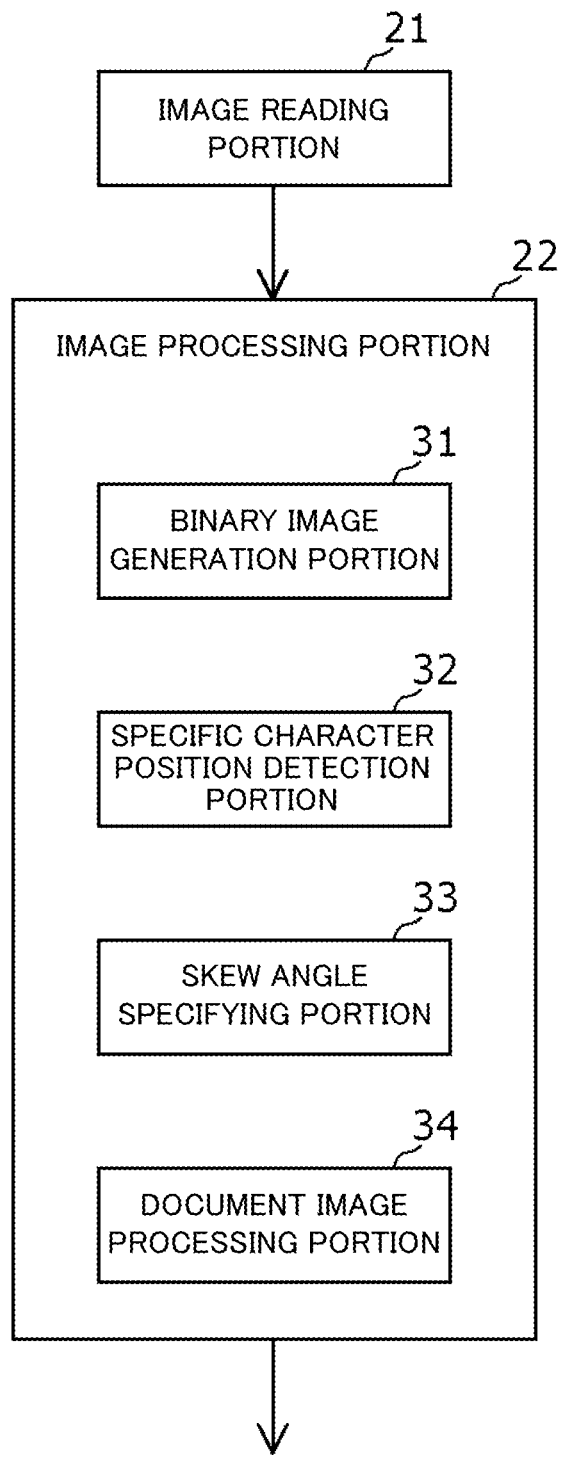
FIG. 2 is a block diagram illustrating an electric configuration of the image processing apparatus according to the embodiment of the present disclosure.

As shown in FIG. 2, image data of a scanned image that includes a document image obtained by the image reading portion 21 is supplied to an image processing portion 22.

Figure 3:
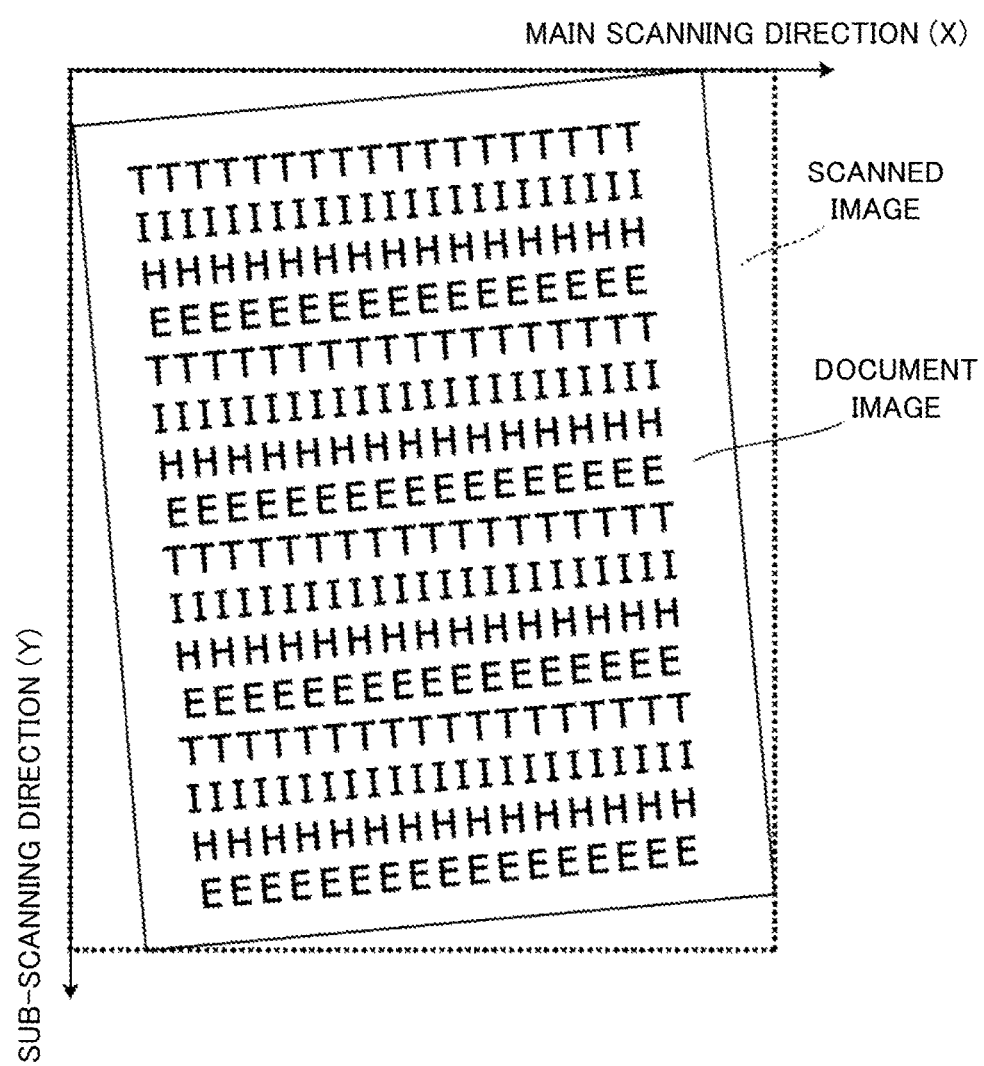
FIG. 3 illustrates an example of a document image in a scanned image.

In a case where a document is read in a skewed state as described above, the rectangular document image is included, in a skewed state, in a rectangular scanned image, as shown in FIG. 3.

The image processing portion 22 includes a binary image generation portion 31, a specific character position detection portion 32, a skew angle specifying portion 33, and a document image processing portion 34. The image processing portion 22 may be implemented as hardware by an ASIC (Application Specific Integrated Circuit) or the like, or may be implemented as software by a program being executed by a computer.

The binary image generation portion 31 binarizes a scanned image obtained by the image reading portion 21, and generates a binary image. In the present embodiment, in particular, by the binary image generation portion 31, the scanned image is binarized and further formed into a thin line image, to generate the binary image.

Figure 4:
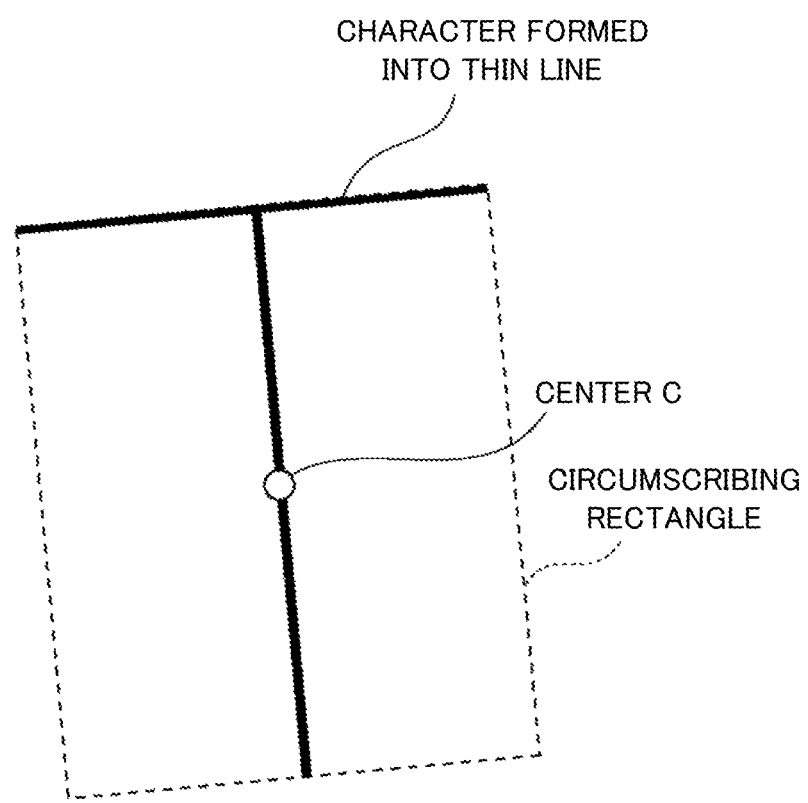
FIG. 4 illustrates a process performed by a specific character position detection portion 32 shown in FIG. 2.

As shown in FIG. 4, the specific character position detection portion 32 (a) specifies rectangles that circumscribe a plurality of characters, respectively, in the generated binary image, (b) detects a plurality of specific characters each having a longitudinal line or a transverse line at the center of the specified circumscribing rectangle, and (c) detects, as positions of the plurality of specific characters, center positions of the longitudinal lines or the transverse lines, within a predetermined range, to be detected, in the main scanning direction or the sub-scanning direction. In FIG. 4, the center position of the character "T" as the specific character is detected.

The width of the range to be detected may be represented as a fixed value or set so as to correspond to the sizes of a plurality of characters. For example, in a case where the width of the range to be detected is set so as to correspond to the sizes of a plurality of characters, when the range to be detected is set as a section in the sub-scanning direction, the width of the range to be detected is set according to the height of the character (for example, N times the height of the character where N is a constant), and, when the range to be detected is set as a section in the main scanning direction, the width of the range to be detected is set according to the width of the character (for example, N times the width of the character where N is a constant).

The skew angle specifying portion 33 specifies an alignment direction in which the plurality of specific characters are aligned, on the basis of the positions of the plurality of specific characters detected in the above-described range to be detected, and specifies a skew angle of the document image in the scanned image on the basis of the specified alignment direction.

Figure 5:
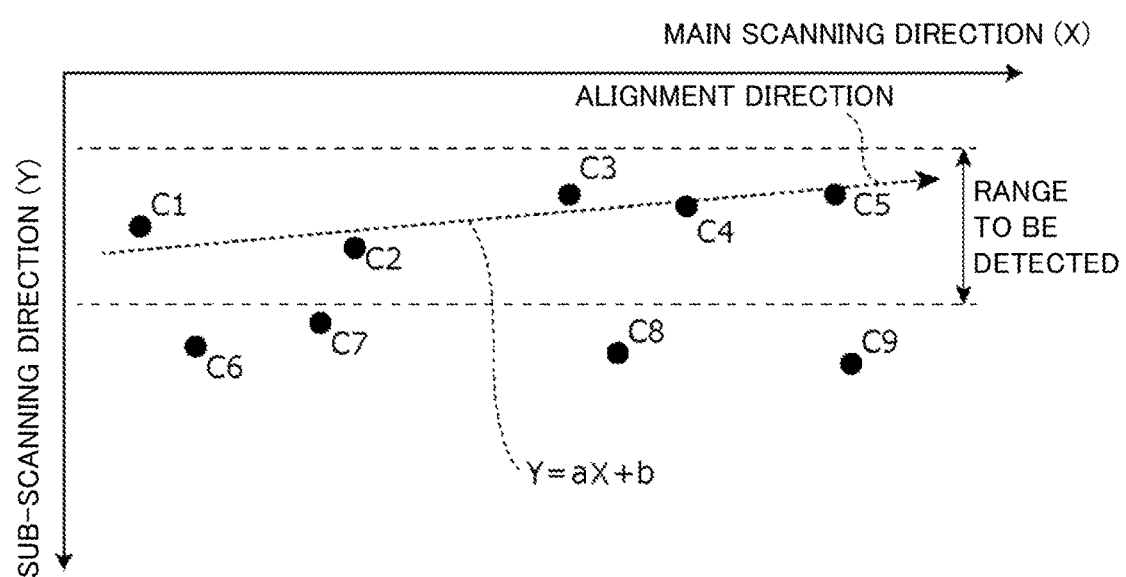
FIG. 5 illustrates a process performed by a skew angle specifying portion 33 shown in FIG. 2.
Figure 6:
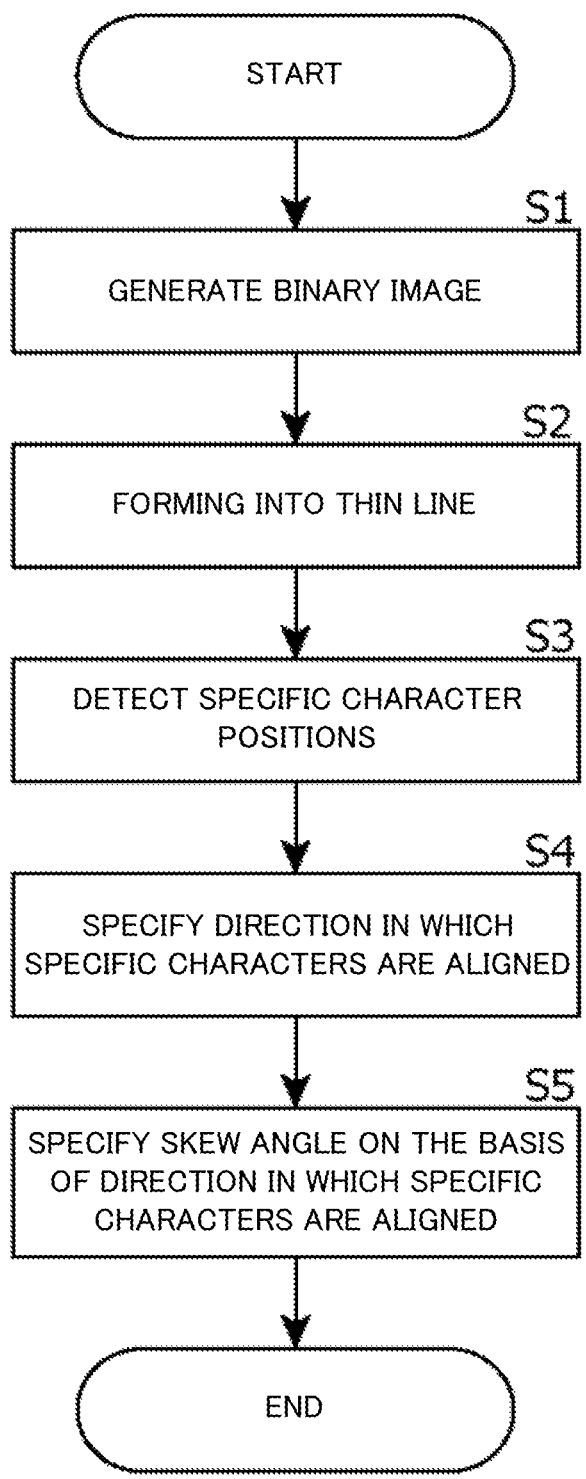
FIG. 6 is a flow chart showing an operation performed by the image processing apparatus shown in FIG. 1.

In the present embodiment, the skew angle specifying portion 33 specifies the alignment direction in which the plurality of specific characters are aligned, by using the least squares method, on the basis of the positions of the plurality of specific characters detected in the range to be detected, as shown in FIG. 5. Specifically, the skew angle specifying portion 33 specifies a linear function (Y=a·X+b) corresponding to positions C1 to C5 of the plurality of specific characters, by using the least squares method, and specifies, as the above-described alignment direction, the direction parallel to the direction represented by the linear function. At this time, positions C6 to C9 of a plurality of specific characters detected outside the above-described range to be detected are not used for specifying the alignment direction in which the plurality of specific characters are aligned.

The document image processing portion 34 rotates, according to the above-described detected skew angle, the document image such that the document image is straightened, and moves, according to the position of the document image, the document image such that, for example, the document image is positioned at the center of an image having a predetermined read size.

In general, in a case where an edge of a document image is specified, and the skew of the document image is detected, the position of the edge is detected on the basis of a spatial density change due to a shadow generated at the edge of the document. However, such a shadow is not generated in some cases. In this case, the skew of the document is not correctly detected. Further, in a case where a background medium is provided as described above, and the position of a corner point of a document image is detected to detect the skew of the document image, when the background medium and the sheet of the document have the same color, the position of the corner point of the document image is not correctly specified. Therefore, a plurality of background mediums having different colors, respectively, are prepared in advance, and the background medium needs to be changed according to the document. Further, in a case where the background medium is provided as described above, the color of the background medium in the scanned image needs to be eliminated, to correctly cut out the document image. Meanwhile, in the image processing apparatus according to the present disclosure, the skew of a document can be correctly detected without detecting the edge of the document image.

Next, an operation performed by the image processing apparatus according to the present embodiment will be described.

When the image processing portion 22 receives image data of a scanned image from the image reading portion 21, the image processing portion 22 performs the following process on the basis of the image data.

Firstly, the binary image generation portion 31 binarizes the scanned image and generates a binary image (step S1), and further forms the binary image into a thin line image (step S2).

Before the binary image is formed into the thin line image, the binary image generation portion 31 may execute closing process and opening process for the binary image, to eliminate a noise (for example, dots in the background portion, missing of dots in the character portion) in the scanned image.

The specific character position detection portion 32 (a) specifies rectangles that circumscribe a plurality of characters, respectively, in the binary image, for example, by using a region dividing technique, (b) determines, for each circumscribing rectangle, whether or not a longitudinal line or a transverse line is included at the center of the circumscribing rectangle, and detects, as the specific character, a character that includes the longitudinal line or the transverse line at the center of the circumscribing rectangle, and (c) detects, as the position of the specific character, the center position of the longitudinal line or the transverse line of the specific character, within a predetermined range, to be detected, in the main scanning direction or the sub-scanning direction (step S3).

The skew angle specifying portion 33 specifies an alignment direction in which the plurality of specific characters are aligned, on the basis of the positions of the plurality of specific characters detected in the above-described range to be detected (step S4).

As shown in FIG. 5, in a case where the range to be detected is set as a section in the sub-scanning direction, the skew angle specifying portion 33 specifies an angle (arc tangent value of the skew a of the above-described linear function) between the main scanning direction and the alignment direction, as the skew angle of the document image in the scanned image. In a case where the range to be detected is set as a section in the main scanning direction, the skew angle specifying portion 33 specifies an angle between the sub-scanning direction and the alignment direction, as the skew angle of the document image in the scanned image (step S5).

The document image processing portion 34 determines whether or not editing for the document image is necessary (for example, rotation, movement), on the basis of the position, the size, and the skew angle of the document image in the read image. When it is determined that editing for the document image is necessary, the necessary editing is performed for the document image.

Thus, the image processing apparatus can correctly detect the skew of the document image (that is, document) without detecting the edge of the document image. Therefore, also in a case where density change does not clearly appear at the edge of the document image, the skew of the document is correctly detected.

Embodiment 2

In Embodiment 2, the specific character position detection portion 32 and the skew angle specifying portion 33 operate as follows. The other components and operation of the image processing apparatus according to Embodiment 2 are the same as in Embodiment 1, and the description thereof is not given.

In Embodiment 2, the specific character position detection portion 32 detects, as positions of the plurality of specific characters, the center positions of the longitudinal lines or the transverse lines described above, in a first range, to be detected, in the main scanning direction, and detects, as positions of the plurality of specific characters, the center positions of the longitudinal lines or the transverse lines described above, in a second range, to be detected, in the sub-scanning direction.

Further, in Embodiment 2, the skew angle specifying portion 33 (a) specifies, as a first alignment direction, an alignment direction in which the plurality of specific characters are aligned, on the basis of the positions of the plurality of specific characters detected in the first range to be detected, and specifies, as a second alignment direction, an alignment direction in which the plurality of specific characters are aligned, on the basis of the positions of the plurality of specific characters detected in the second range to be detected.

The skew angle specifying portion 33 (b) specifies: variation among the positions of the plurality of specific characters detected in the first range to be detected, in a direction perpendicular to the first alignment direction; and variation among the positions of the plurality of specific characters detected in the second range to be detected, in a direction perpendicular to the second alignment direction, and (c) specifies an alignment direction, among the first alignment direction and the second alignment direction, in which variation is smaller, and specifies the skew angle of the document image in the scanned image, on the basis of the specified alignment direction.

The above-described variation represents, for example, dispersion or a standard deviation of distances from the line of the above-described linear function to the positions of the specific characters, or the maximum value of a distance, in the direction perpendicular to the alignment direction, between positions of the two specific characters selected from the detected specific characters.

As described above, according to Embodiment 2, the skew angle of the document image is correctly detected regardless of whether sentences in the document image are horizontally written or vertically written.

Various changes and modifications to the above-described embodiments are apparent to a person skilled in the art. Such changes and modifications may be made without departing from the gist and the scope of the subject matter and reducing the intended advantageous effects. That is, such changes and modification are intended to be embraced by the appended claims.

The present disclosure is applicable to, for example, scanners, copying machines, multifunction peripherals, and the like.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
 a binary image generation portion configured to binarize a scanned image and generate a binary image;
 a specific character position detection portion configured to (a) specify rectangles that circumscribe a plurality of characters, respectively, in the binary image, (b) detect a plurality of specific characters having longitudinal lines or transverse lines at centers of the specified circumscribing rectangles, and (c) detect, as positions of the plurality of specific characters, center positions of the longitudinal lines or the transverse lines, within a predetermined range, to be detected, in a main scanning direction or a sub-scanning direction; and
 a skew angle specifying portion configured to specify an alignment direction in which the plurality of specific characters are aligned, on the basis of the positions of the plurality of specific characters detected in the predetermined range to be detected, and specify a skew angle of a document image in the scanned image on the basis of the specified alignment direction;
 wherein the specific character position detection portion detects, as the positions of the plurality of specific characters, center positions of the longitudinal lines or the transverse lines, in a first range, to be detected, in the main scanning direction, and detects, as the positions of the plurality of specific characters, center positions of the longitudinal lines or the transverse lines, in a second range, to be detected, in the sub-scanning direction, and the skew angle specifying portion (a) specifies, as a first alignment direction, an alignment direction in which the plurality of specific characters are aligned, on the basis of the positions of the plurality of specific characters detected in the first range to be detected, and specifies, as a second alignment direction, an alignment direction in which the plurality of specific characters are aligned, on the basis of the positions of the plurality of specific characters detected in the second range to be detected, (b) specifies: variation among the positions of the plurality of specific characters detected in the first range to be detected, in a direction perpendicular to the first alignment direction; and variation among the positions of the plurality of specific characters detected in the second range to be detected, in a direction perpendicular to the second alignment direction, and (c) specifies an alignment direction, among the first alignment direction and the second alignment direction, in which variation is smaller, and specifies the skew angle of the document image in the scanned image, on the basis of the specified alignment direction.

2. The image processing apparatus according to claim 1, wherein a width of the predetermined range to be detected is set so as to correspond to sizes of the plurality of characters.

3. The image processing apparatus according to claim 1, wherein the skew angle specifying portion specifies an alignment direction in which the plurality of specific characters are aligned, by using a least squares method, on the basis of the positions of the plurality of specific characters detected in the predetermined range to be detected.

4. The image processing apparatus according to claim 1, wherein the binary image generation portion binarizes the scanned image and further forms the scanned image into a thin line image, to generate the binary image.

\* \* \* \* \*